No. 819,694. PATENTED MAY 1, 1906.
K. I. FAUST.
RUNNING GEAR FOR BABY CARRIAGES.
APPLICATION FILED NOV. 25, 1904.

2 SHEETS—SHEET 1.

WITNESSES:
E. M. Norling.
D. T. Davis

INVENTOR:
Karl I. Faust,
by his attorney
J. B. Fay.

No. 819,694. PATENTED MAY 1, 1906.
K. I. FAUST.
RUNNING GEAR FOR BABY CARRIAGES.
APPLICATION FILED NOV. 25, 1904.

2 SHEETS—SHEET 2.

WITNESSES:
E. M. Norling.
D. S. Davis

INVENTOR:
Karl I. Faust,
by his attorney
J. B. Fay

UNITED STATES PATENT OFFICE.

KARL I. FAUST, OF CLEVELAND, OHIO.

RUNNING-GEAR FOR BABY-CARRIAGES.

No. 819,694.          Specification of Letters Patent.          Patented May 1, 1906.

Application filed November 25, 1904. Serial No. 234,167.

*To all whom it may concern:*

Be it known that I, KARL I. FAUST, a citizen of the United States, and a resident of Cleveland, county of Cuyahoga, and State of Ohio, have invented a new and useful Improvement in Running-Gear for Baby-Carriages, of which the following is a specification, the principle of the invention being herein explained and the best mode in which I have contemplated applying that principle so as to distinguish it from other inventions.

My invention relates to a running-gear for baby-carriages and go-carts, and particularly to that class of such devices which is adaptable to various forms of carriage and cart bodies, and has for its object the production of a device of such character which shall be simple in construction and comfortable and efficient in operation.

Said invention consists of means hereinafter fully described, and specifically set forth in the claims.

The annexed drawings and the following description set forth in detail certain means embodying my invention, the disclosed means constituting, however, but one of various mechanical forms in which the principle of the invention may be used.

Figure 1:
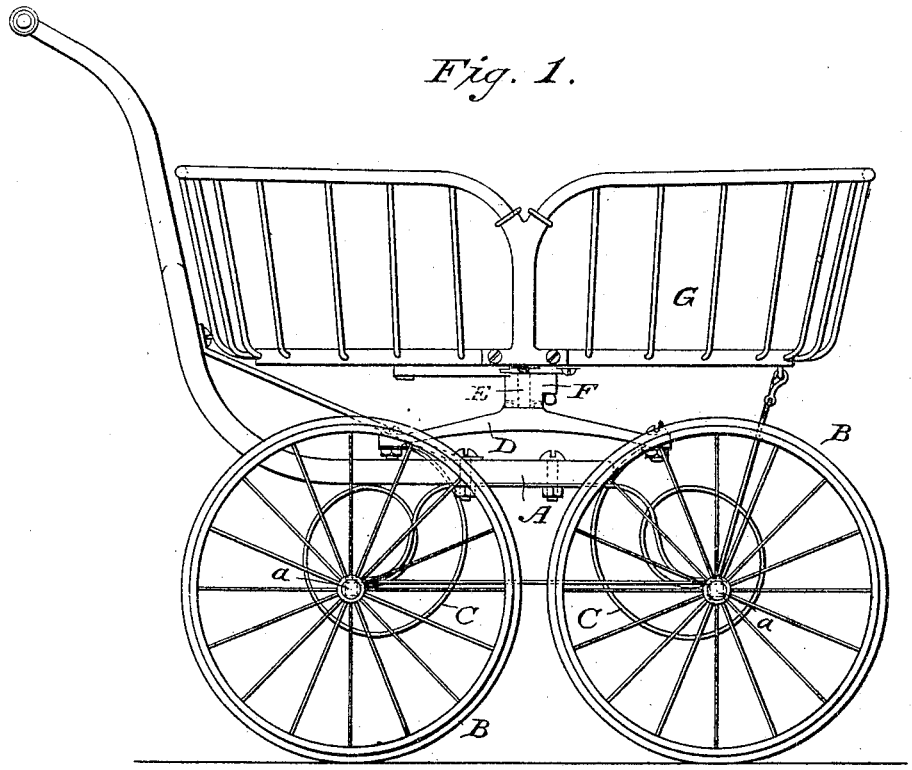
Figure 2:
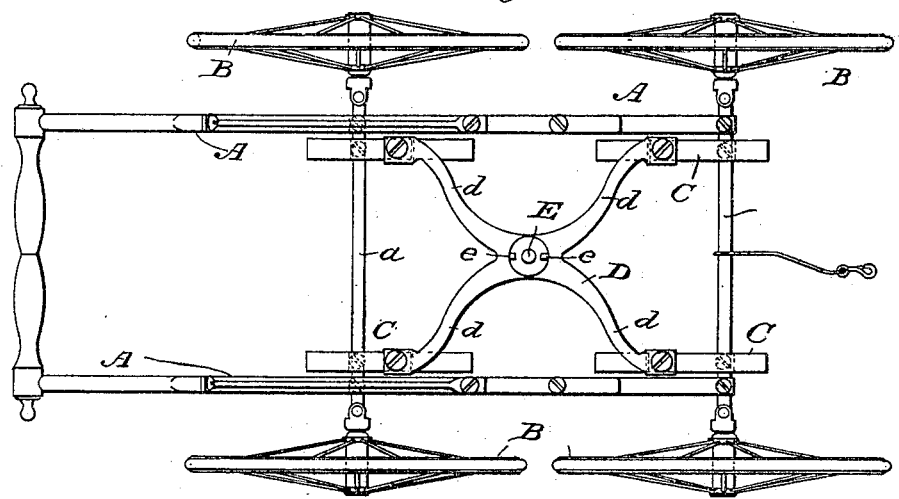
Figure 3:
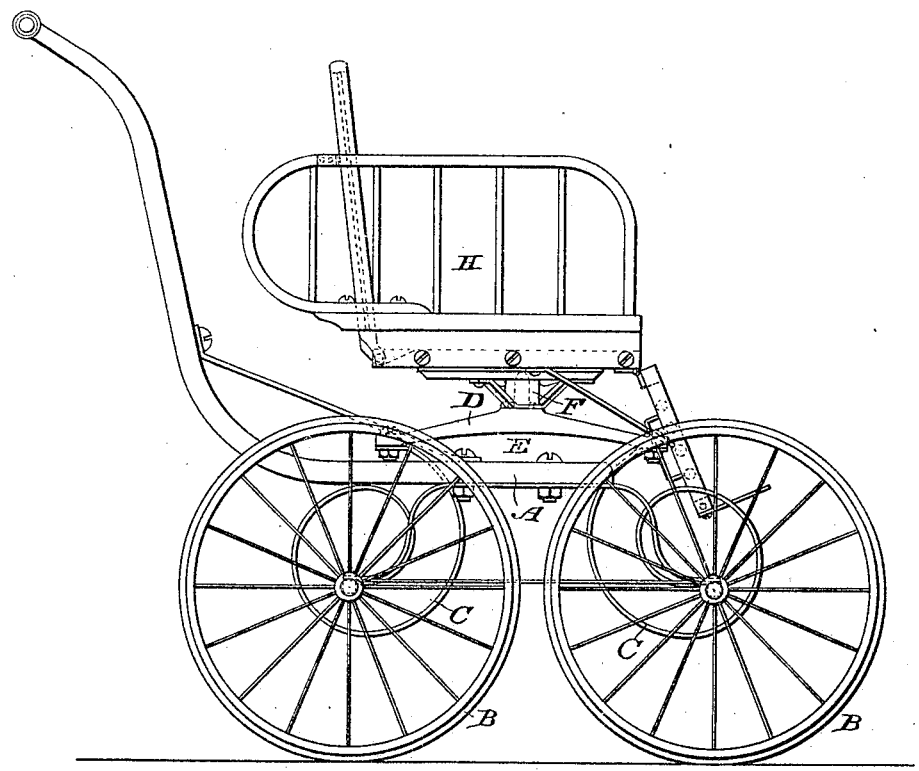

In said annexed drawings, Figure 1 represents a side view of a carriage frame and bed-body provided with my improved running-gear. Fig. 2 represents a plan view thereof, the bed-body being removed, and Fig. 3 represents said gear as applied to a go-cart.

My invention comprises a frame A of any suitable construction, including two transverse members *a a*, to the ends of which are journaled the wheels B B. Upon each such member *a* are mounted two spiral springs C, which have their inner ends secured to said members. Supported upon said springs is a spider D, which is provided with a plurality of radial legs *d*, four, as shown, each of said legs *d* being secured to the outer end of one of the springs C. The spider D is provided with a centrally-located vertical stud E, which is adapted to be received into a suitable bearing portion F upon the under side of a carriage-body or a go-cart body, as shown in Figs. 1 and 3, respectively, and thus support such body. Small rectangular lugs *e e* upon the spider adjacent to the stud E are received into suitable recesses in the bearing portion F of the carriage-body and prevent the movement of the latter relatively to the spider D. The bed-body G, bearing portion F, and connected parts, Fig. 1, as well as the chair-body H, bearing portion F, and connected parts, Fig. 2, are capable of use in other relations, such as an infant's crib, a jumper, support for a bath-tub, &c., and may be readily removed from the carriage or go-cart frame and placed upon a suitable support and caused to subserve these purposes. Such uses of the bed-body, bearing portion, and adjacent parts, together with suitable supports therefor, are described and claimed in a pending application for United States Letters Patent.

Other modes of applying the principle of my invention may be employed instead of the one explained, change being made as regards the means herein disclosed, provided the means stated by any one of the following claims or the equivalent of such stated means be employed.

I therefore particularly point out and distinctly claim as my invention—

1. In a running-gear for baby-carriages, the combination of a frame including two transverse members, two spiral springs mounted on each such member and having their inner ends secured thereto, and a spider having its legs secured to the outer ends of said springs respectively.

2. In a running-gear for baby-carriages, the combination of a frame including two transverse members, two spiral springs mounted upon each member and having their inner extremities secured thereto, and curving inwardly toward the central plane of the frame, the outer extremities of said springs terminating in a horizontal plane above said frame; and a spider having radial legs, the extremities of the latter being secured to the outer extremities of said springs respectively.

Signed by me this 17th day of November, 1904.

KARL I. FAUST.

Attest:
E. M. NORLING,
A. E. MERKEL.